CHAS. R. CAPPS. IMP'D. ANIMAL TRAP.

PATENTED
FEB 25 1868

74889

Witnesses:
Sam'l. E. Boyd
Jno. W. Terry

Inventor:
Chas. R. Capps
by Boyd & Co. Att'ys

United States Patent Office.

CHARLES R. CAPPS, OF ILLIOPOLIS, ILLINOIS.

Letters Patent No. 74,889, dated February 25, 1868.

IMPROVED ANIMAL-TRAP.

*The Schedule referred to in these Letters Patent and making part of the same.*

TO ALL WHOM IT MAY CONCERN:

Be it known that I, CHARLES R. CAPPS, of Illiopolis, county of Sangamon, and State of Illinois, have invented a new and useful Improved Animal-Trap, of which the following is a full, clear, and exact description, reference being had to the annexed drawing, making a part of this specification, in which—

Figure 1:
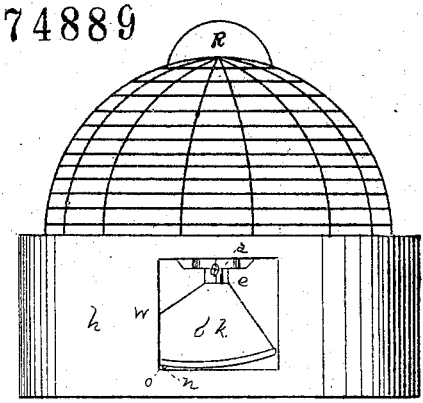
Figure 2:
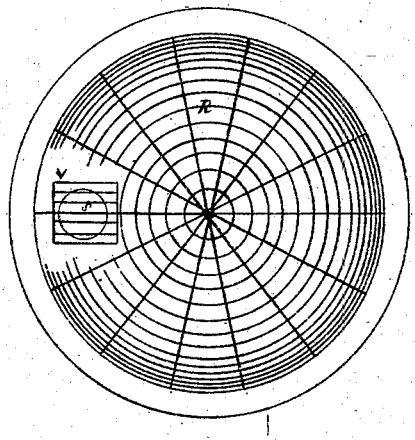
Figure 3:
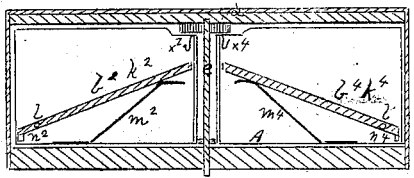
Figure 4:
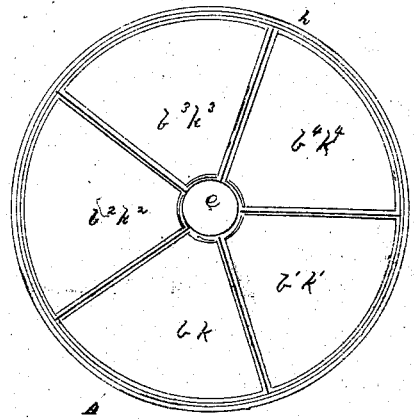

Figure 1 represents a side elevation of my trap.
Figure 2 represents a top view of same.
Figure 3 represents a sectional elevation of same.
Figure 4 represents a top view of the trap with the cover removed.
Similar letters indicate like parts.

It consists of a horizontal disk, A, figs. 3, 4, divided into several sections, $b$, fig. 1, $b^2 b^4$, fig. 3, and $b b^1 b^2$, &c., fig. 4, by vertical radial partitions, $c c^1$, fig. 1, $c c^1 c^2$, &c., fig. 4. This disk revolves with the vertical shaft $e$, figs. 1, 3, and 4, by the action of the coil-spring $d$, figs. 1 and 3, attached to the top of the shaft. Around the disk is placed a circular metal case, $h$, with wooden bottom and top, the bottom having an opening to receive the key to wind up the spring $d$. Each section has a separate platform, $k$, fig. 1, $k^2 k^4$, fig. 3, $k k^1 k^2$, &c., fig. 4, having its outer edge resting on pivots, as seen at $l l'$, fig. 3, while the other end is supported in an inclined position by a spring, $m^2 m^4$, fig. 3. To the under side of each platform is fastened a stud, $n$, fig. 1, $n^2 n^4$, fig. 3, which striking against the projection $o$, fig. 1, in the bottom of the case, prevents the disk from revolving. A wire cage, R, figs. 1 and 2, is attached to the top of the case, and has an opening, $s$, into the casing, covered by a trap-door, $v$, opening upwards, and so arranged as to be directly over the section $b^2$, next the door $w$ of the case. In each section is a hook, $x^2 x^4$, fig. 3, to hold the bait. The spring being wound up, and the bait fixed, the trap is ready for use.

When an animal, a rat, for instance, seeking to reach the bait, has passed completely within the case, his weight depressing the platform, disengaging the stud, and allowing the spring $d$ to act, the disk revolves, carrying with it the spring $m$, platform, and partitions, with the rat, until it comes beneath the opening $s$, when the stud on the next section stops its further revolution, and the rat passes into the cage R. The same process is repeated with the next rat entering the section which faces the door.

In order that there may be light enough to induce the rat to enter, the part of the casing opposite the door is covered with a net-work of wire only. The cage R may either be arranged with a door to take the rats out, or the cage may be taken off the casing, and the rats drowned by immersing it in water.

With this trap any number of animals may be caught at one setting, the number being limited by the length of the coil-spring, and the size of the cage R, and not, as in many others, by the number of revolving partitions into which the trap is divided. By having the platform on which the animal stands revolve, there is less liability to have the machine trigged by some part of the animal catching while being pushed along, as in other traps, in which only the sides of the sections move, the platform being stationary.

I do not claim to be the first inventor of the use of a revolving disk, divided by partitions, and actuated by a spring; but What I do claim as my invention, and desire to secure by Letters Patent, is—

The combination of the disk A, sections $b b^1 b^2 b^3 b^4$, platforms $k k^1 k^2 k^3 k^4$, with their studs and springs, as shown, projection $o$, spiral spring $d$, casing $h$, and cage R, of an animal-trap, as and for the purpose specified.

CHARLES R. CAPPS.

Witnesses:
SAM'L S. BOYD,
HENRY T. CARTER.